Feb. 22, 1966 J. W. VAUGHAN 3,237,101
TEMPERATURE COMPENSATED HIGH FREQUENCY THERMAL POWER DETECTOR
Filed Aug. 29, 1961 2 Sheets-Sheet 1

Sect. B-B

INVENTOR
JAMES W. VAUGHN
BY
ATTORNEY

United States Patent Office 3,237,101
Patented Feb. 22, 1966

3,237,101
TEMPERATURE COMPENSATED HIGH FREQUENCY THERMAL POWER DETECTOR
James W. Vaughan, Palo Alto, Calif., assignor to Hewlett-Packard Company, Palo Alto, Calif., a corporation of California
Filed Aug. 29, 1961, Ser. No. 134,611
10 Claims. (Cl. 324—95)

This invention relates to power detectors and more particularly to mounting means which provide temperature compensation for the power-sensing elements of a power measuring instrument.

High frequency electrical power may be measured with the aid of a heat-sensitive element, such as a thermistor. In a typical power-measuring circuit, a thermistor which is adapted to receive the high frequency power is included in a bridge circuit. The change in the resistance of the thermistor is proportional to the change in the internal temperature of the thermistor and hence to the power applied to it. Thus, the applied power produces a change in the thermistor resistance which affects the balance condition of the bridge circuit. The changes in the elements of the bridge circuit which are required to restore the balance condition provide an indication of the power that is applied to the thermistor.

Since the thermistor is a heat-sensitive device, the indication of applied power thus obtained is affected by changes in the temperature of its envirnoment. The term thermistor environment includes the elevated temperatures of mounting points, the difference in temperatures between mounting points, the surrounding air temperature and other such factors which affect the internal temperature of the thermistor. Several methods have been used to reduce the effect upon the measured power of changes in the environmental temperatures. One such method is to use an additional thermistor, operating in an environment similar to the environment of the power-sensing thermistor and shielded from the high frequency power, to compensate the bridge circuit for temperature changes. The two thermistors are usually included in separate bridge circuits and thus are required to be electrically insulated from each other. However, it is essential for high measurement accuracy using this method of temperature compensation that the two thermistors operate in substantially equal thermal environments. This may be achieved by thermally joining the thermistor mounting points using high thermal conductivity materials and by thermally insulating the mounting points from the surrounding structure. Thus, thermal transients in the surrounding structure caused by handling and other factors only affect the thermistor environments by small amounts. In addition, since the thermistor mounting points are thermally joined using high thermal conductivity materials, thermal transients in the surrounding structure affect the thermistor environments equally and thereby produce only a negligible effect upon the accuracy of the power measurement. It can thus be seen to be desirable not only to tie the thermistors together thermally, but also to insulate thermally the thermistors from the surrounding structure.

Therefore, it is an object of the present invention to provide mounting means which provide substantially equal thermal environments for the thermistors of a power detector and which protect the thermistors from the effects of large thermal transients in the surrounding structure.

It is another object of the present invention to provide mounting means for the thermistors of a power detector which thermally connect the thermistors together and which thermally insulate the thermistors from the surrounding structure.

In accordance with a preferred embodiment of the present invention, high thermal conductivity materials are used to thermally connect the end terminals of the two thermistors. This insures that the thermistors operate in substantially equal thermal environments. The electrical insulators which are required in the present invention to insulate electrically the respective thermistor circuits are made of high thermal conductivity materials. In addition, the thermistors are thermally insulated from the surrounding structure by low thermal conductivity materials. These low thermal conductivity materials are plated with a thin electrically conductive coating where electrical conductivity and thermal insulation are required.

Other and incidental objects of the present invention will be apparent from a reading of this specification and an inspection of the accompanying drawing in which.

Figures 1, 2:
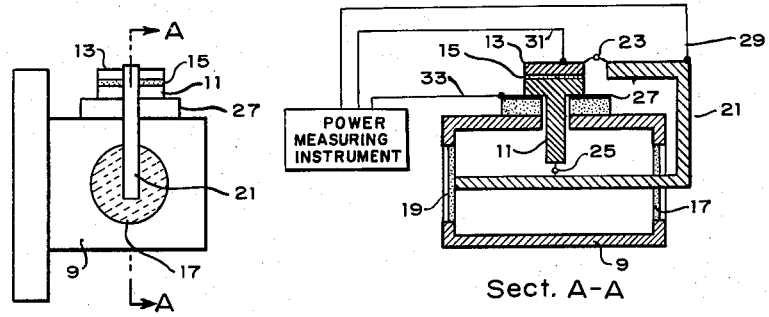
FIGURE 1 is a side view of a waveguide detector mount.
FIGURE 2 is a sectional view of the waveguide detector mount of FIGURE 1.

Referring now to FIGURE 1, the waveguide detector mount 9 and the post assembly comprising post 11, cap 13 and insulator 15 are shown in side view. End section 17, which is made of low thermally conductive material such as plastic, is inserted in the side wall of the detector mount 9. A similar end section 19 is located in the opposite side wall. The inside surfaces of these end sections constitute a portion of the inner walls of the detector mount 9, which mount serves as an envelope to contain microwave energy. The microwave energy is contained within the side walls of the detector mount 9 about the end sections 17 and 19 by providing an electrically conductive coating on the inside surfaces of these end sections. Post 11 is supported by wafer 27 which is made of low thermal and electrical conductivity material, such as plastic. The temperature of the post assembly is thus unaffected by sudden changes in the temperature of the detector mount 9. The top surface of wafer 27 is coated with an electrically conductive material which is connected to post 11. This electrical coating serves as one plate of a capacitor and the detector mount 9 serves as the other plate. Thus, the microwave energy which appears on post 11 is filtered out by this capacitor.

Referring now to FIGURE 2, the waveguide detector mount 9 is shown in cross-sectional view. A bar 21 of high thermal and electrical conductivity material, such as copper, is centrally located between the broad walls of detector mount 9 and in plane-parallel relationship therewith. The end sections 17 and 19 of thermally insulating material are adapted to provide support for the bar 21. The end sections 17 and 19 thus serve to insulate thermally the bar 21 from sudden changes in the temperature of the detector mount 9. The conductive coatings on the inside surfaces of end sections 17 and 19 maintain high electrical conductivity of the inside surfaces of the waveguide walls, thereby preventing the loss of microwave energy. Two thermistors 23 and 25 are provided, one 25 disposed inside the detector mount to receive the microwave energy, the other 23 located outside the detector mount, insulated from the microwave energy. These thermistors may have matched characteristics for proper operation with electrical circuits requiring identical thermistors. One terminal of each of thermistors 23 and 25 is connected to bar 21. Since the thermal conductivity of the bar material is very high, the thermal gradients along the length of the bar are made small. Bar 21 thus constitutes a path of high thermal and electrical conductivity joining the thermistors. This insures that the terminals connected to bar 21 are at substantially the same temperature. Another path of high thermal conductivity and joining the second terminals of each of the thermistors 23 and 25 is provided by the center post structure comprising cap 13, insulator 15, and post 11. The cap 13 and post 11 are made of high thermal conductivity material, such as copper, and the electrical insulator 15 is made of high thermal conductivity material, such as anodized aluminum. This insures that the second terminals of each of the first and second thermistors are at substantially the same temperatures. Thus, since high thermal conductivity materials are used to join thermistors 23 and 25, the terminals of each of the thermistors that are connected to the same thermal path are maintained at substantially the same temperature, independent of the temperature of the detector mount 9. By mounting the thermistors symmetrically between each of the paths, i.e., by making the lead lengths equal, the thermal environments for the thermistors are made substantially equal.

The electrical circuits for each of the thermistors 23 and 25 have a common connection 29 at bar 21. The other connection to thermistor 23 is made on cap 13 and the other connection for thermistor 25 is made on post 11. Thermistor 25, which is adapted to receive the microwave power, can thus be connected to a power indicating circuit and the reference thermistor 23 may be connected to a temperature reference circuit.

Figure 3:
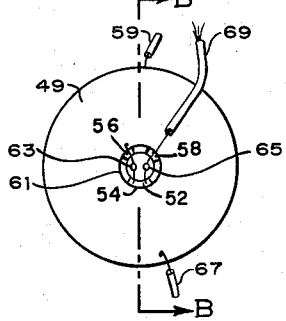
FIGURE 3 is a rear view of a coaxial detector mount.
Figures 4, 5:
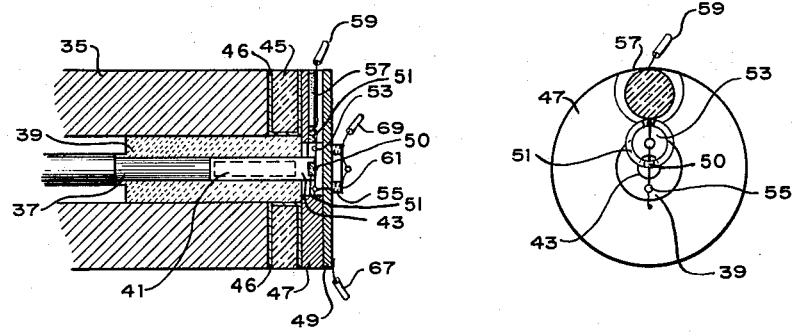
FIGURE 4 is a sectional view of the detector mount of FIGURE 3.
FIGURE 5 is a front view of the thermistor mounting plate for the coaxial detector mount of FIGURE 4.

The present invention is also embodied in a detector mount which is particularly suited for attachment to a coaxial line. A rear view of the coaxial line detector mount is shown in FIGURE 3 and sectional and exploded views of the mount are shown, respectively, in FIGURES 4 and 6. The body 35, which is made of electrically conductive material, serves as an envelope to contain the high frequency energy which appears on the center conductor 37. Dielectric material 39 of low thermal conductivity supports the center conductor concentrically within body 35. A capacitor 41 is disposed between the slotted end post or stirrup 43 and center conductor 37 to conduct high frequency electrical energy and to provide thermal and low frequency insulation between the stirrup and the center conductor. Capacitor 41 is a thin hollow tube of low thermally conductive dielectric material such as barium titanate ceramic which has a conductive metal coating on each of the inner and outer surfaces. One of the inner and outer surfaces is connected to the center conductor 37 and the other of the surfaces is connected to the stirrup 43. Thermal insulator 45, attached to the end of body 35, is coated with a thin electrically conductive film 46 to form part of the electrically conductive envelope around center conductor 37. A mounting plate 47 of high thermal and electrical conductivity material, such as copper, and having a central aperture disposed to receive the stirrup 43 is attached to the thermal insulator 45. A frontal view of mounting plate 47 is shown in FIGURE 5. The rear plate 49, shown in FIGURE 3, also of high thermal and electrical conductivity, is attached to the rear surface of mounting plate 47. A dielectric ring 51 of high thermal conductivity material is attached to the stirrup 43 and to the mounting plate 47 to thermally connect thereby stirrup 43 and mounting plate 47.

For reasons based on electrical design, two thermistors 53 and 55 connected in parallel are used in the coaxial detector mount to detect the applied electrical power. One thermistor 55 is connected between stirrup 43 and mounting plate 47. The other thermistor 53 is connected between the stirrup 43 and a metallized segment of dielectric ring 51. A by-pass capacitor 57 which comprises a thin wafer of dielectric material having conductive surface coatings is attached to the metallized segment of dielectric ring 51. Thus, the high frequency electrical energy appearing on stirrup 43 is applied to thermistors 53 and 55 in parallel. An electrical connection 59 to the thermistors 53 and 55 is provided by the ungrounded plate of by-pass capacitor 57. Direct current signals for biasing the thermistors are not affected by capacitor 57 and are isolated from external circuits connected to the center conductor 37 by capacitor 41. Dielectric ring 61 of high thermal conductivity material attached to the rear plate 49 serves to support the serially connected reference thermistors 63 and 65. Two serially connected thermistors are required for the reference signals to match the electrical circuit conditions provided by the detector thermistors 53 and 55 which are serially connected for direct current signals. An electrical connection 67 is made to the rear plate 49. One terminal of serially connected thermistors 63 and 65 is connected to the rear plate 49 and electrical connection 69 is made to the other terminal of the serially connected thermistors.

It should be noted that one thermal path of low electrical conductivity from the common terminal 50 of the detector thermistors 53, 55 on stirrup 43 to the common terminal 52 of the reference thermistors 63, 65 on metallized segment 54 of dielectric ring 61 is provided by the dielectric ring 51, the mounting plate 47, the rear plate 49, and the dielectric ring 61. Another thermal path of high electrical conductivity from the remaining terminals of the detector thermistors 53, 55 to the remaining terminals of the reference thermistors 63, 65 on metallized segments 56, 58 of dielectric ring 61 is provided by the mounting plate 47, the rear plate 49 and the dielectric ring 61. These paths are thermally insulated from the body 35 and from the center conductor 37 by the insulator 45 and capacitor 41, respectively. The electrical connection 67 on the rear plate 49 connects to the common terminals of the thermistors joined to the last-mentioned thermal path. Electrical connections are also made to the other terminals of these thermistors at their junctions with the first mentioned thermal path. In addition, to obviate the need for symmetrical mounting of the thermistors between the first-mentioned and last-mentioned thermal paths and to facilitate ease of construction, thermal shunts around each of the thermistors are provided by the dielectric rings 51 and 61 in the particular embodiment of the present invention shown in FIGURE 4. Thus, the end terminals of each of the thermistors are maintained at the same temperature and the effect of dissimilar thermal conduction along the length of the thermistor leads is materially reduced. The entire structure surrounding the power detecting and reference thermistors is thus thermally isolated from the body and the center conductor of the coaxial line and is therefore unaffected by sudden changes in the temperature of these components.

Figure 6:
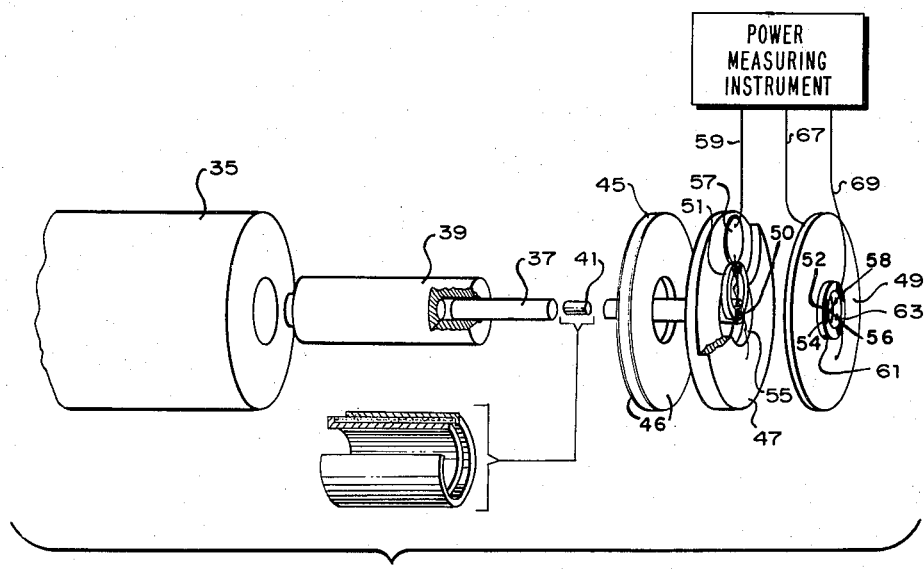
FIGURE 6 is an exploded view of the detector mount of FIGURE 4.

In the embodiment of the present invention shown in sectional view in FIGURE 2 and in the embodiment shown in sectional and exploded views, respectively, in FIGURES 4 and 6 suitable surrounding covers are provided to reduce the effect of moving air currents about the thermistors. These covers are omitted from the drawing for purposes of simplicity.

Therefore the apparatus of the present invention provides the means to isolate the thermistors of a power measuring instrument from the effects of sudden changes which may occur in the temperature of the surrounding structure. This permits the detector mount to be handled or connected to hot equipment without significantly affecting the operation of the electrical circuits. This thermal isolation between the thermistors and the envelope also obviates the need for a large thermal mass to reduce the effects of externally applied thermal transients. In addition, high thermal conductivity materials in the paths joining the thermistors of the present invention reduce the thermal gradients between the thermistors to a minimum, thereby insuring that the operating temperatures of the thermistors are substantially equal regardless of environmental conditions.

I claim:

1. Microwave signal apparatus comprising a section of waveguide adapted to conduct a microwave signal therein, a bar of high thermal and electrical conductivity material positioned between the broad walls of said waveguide and normal to the narrow walls of said waveguide, said bar extending through a narrow wall of said waveguide and being thermally insulated from said waveguide and electrically connected thereto, a post assembly having high thermal and low electrical conductivity between the ends thereof extending through a broad wall of the waveguide to provide an end of the post assembly inside the waveguide and an end outside the waveguide, said post assembly being thermally and electrically insulated from the waveguide, a first bolometer element connected between the end of the post assembly inside the waveguide and the bar, a second bolometer element connected between the end of the post assembly outside the waveguide and the end of the bar outside said waveguide, means electrically connected to the end of said post assembly inside said waveguide to filter out high frequency energy appearing on said post assembly, and means providing electrical connections to the first and second bolometer elements whereby a power measuring instrument is connectable to said bolometer elements for providing an indication of the power of microwave signal in said waveguide.

2. A power detector for attachment to waveguide apparatus, said detector comprising the combination of a section of rectangular waveguide adapted to conduct a microwave signal therein, a bar of high thermal and electrical conductivity material positioned between the broad walls of said waveguide normal to the narrow walls of the waveguide, said bar extending through a narrow wall of the waveguide and having one end located therewithout, first and second end sections of low thermal conductivity material positioned in the narrow walls of the waveguide for supporting the bar, a coating of electrical conductivity material on the inner surface of each of the end sections, a post of high electrical and thermal conductivity material extending through a broad wall of the waveguide in line with the bar therewithin, said post being thermally and electrically insulated from said waveguide, a cap of high electrical and thermal conductivity material thermally connected to the post and electrically insulated therefrom, a first bolometer element connected between the end of the post within the waveguide and the bar, a second bolometer element connected between the cap and said one end of the bar located outside the waveguide, and means electrically connected to the bar, post and cap, and responsive to the operating conditions of said bolometer elements for providing an indication of the power of the microwave signal in the waveguide.

3. A waveguide power detector comprising a section of rectangular waveguide adapted to conduct a microwave signal therein, a bar of high thermal and electrical conductivity material centrally positioned between the broad walls of said waveguide, the bar being normal to the narrow walls of the waveguide and having an end located therewithout, first and second end sections of low thermal conductivity material positioned in the narrow walls of the waveguide and adapted to support the bar, a coating of electrical conductivity material on the inner surfaces of each of the end sections, a post of high electrical and thermal conductivity material extending through a broad wall of the waveguide substantially equidistant from the narrow walls and in line with the bar therewithin, a wafer of thermally and electrically insulating material to support the post on said waveguide, said wafer having coatings of electrically conductive material on the surfaces thereof, one of the coatings being connected to the post, the other of the coatings being connected to the waveguide, a cap of high electrical and thermal conductivity material thermally connected to the post and electrically insulated therefrom, a first thermistor electrically and thermally connected symmetrically between the end of the post within the waveguide and the center of said bar, a second thermistor electrically and thermally connected symmetrically between the cap and said end of the bar, and means electrically connected to the bar, post and cap, and responsive to the operating conditions of said thermistors to provide an indication of the power of the microwave signal in the section of waveguide.

4. A power detector for attachment to the inner and outer conductors of a coaxial transmission line, said detector comprising the combination of an electrically conductive outer body and an inner conductor adapted to be connected, respectively, to the outer and inner conductors of a transmission line, first means, a capacitor of low thermal conductivity connecting the inner conductor and the first means, second means of high thermal and electrical conductivity material electrically connected to said outer body and thermally insulated therefrom, means thermally connecting the first and second means, a first thermistor thermally and electrically connected between the first and second means and disposed to receive the electrical energy on said inner conductor, a second thermistor having one terminal electrically and thermally connected to the first means and having the other terminal thermally connected to the second means, the second thermistor bing disposed to receive the electrical energy on said conductor, alternating signal conducting means electrically connecting said other terminal of the second thermistor and the second means, serially connected third and fourth thermistors isolated from the electrical energy on said inner conductor and being thermally joined to the second means, one terminal of the serially connected third and fourth thermistors being electrically connected to the second means, means providing electrical connections to the other terminal of the serially connected third and fourth thermistors, to said other terminal of the second thermistor and to the second means, whereby a power measuring instrument is connectable to said thermistors for providing an indication of the power of signal on said coaxial transmission line.

5. Electrical signal apparatus comprising a section of outer conductor of an electric wave transmission line which conducts an electrical signal therein, first and second bolometric resistive elements, each having first and second terminals and each having an impedance that is related to the operating temperature thereof, the first bolometric resistive element being disposed within said section of outer conductor to receive the electrical signal, the second bolometric resistive element being positioned outside the section of outer conductor, means forming a first path of high thermal conductivity and low electrical conductivity between said first terminals of the first and second bolometric resistive elements, said means forming the first path being thermally and electrically insulated from the section of outer conductor, means forming a second path of high thermal and electrical conductivity between said second terminals of the first and second bolometric resistive elements, said means forming the second path being thermally insulated from and electrically connected to the section of outer conductor, and a power measuring instrument electrically connected to the terminals of the first and second bolometric resistive elements and responsive to the impedances thereof to provide an indication of the power of the electrical signal on said transmission line.

6. Apparatus according to claim 5 comprising a high frequency filter connected to the first terminal of the first bolometric resistive element for filtering out high frequency signal appearing thereon.

7. High frequency power detector apparatus comprising a conductor of a wave transmission line which is adapted to conduct a signal therein, first means supported within said conductor and disposed to receive the signal, said first means being thermally and electrically insulated from said conductor, second means of high thermal and electrical conductivity supported by said conductor, said second means being electrically connected to and thermally insulated from the conductor and being electrically insulated from said first means, a first bolometer element electrically and thermally connected between said first and second means, third means thermally connected to the first means and electrically insulated therefrom, a second bolometer element isolated from said signal and being thermally and electrically connected between the second and third means, and means providing electrical connections to the first and second bolometer elements, whereby a power measuring instrument is connectable to said bolometer elements for providing an indication of the power of the signal on said transmission line.

8. A power detector as in claim 2 including capacitor means connected between said post and waveguide for filtering out high frequency energy appearing on said post.

9. A power detector for attachment to the conductors of an electrical wave transmission line, said detector comprising the combination of a body adapted to be connected to one conductor of a transmission line and having an inner conductor therein adapted to be connected to another conductor of a transmission line, first means electrically connected to the inner conductor and thermally insulated therefrom, second means of high thermal and electrical conductivity, means electrically connecting and thermally insulating the second means and said body; means thermally connecting the first and second means together, at least one bolometer element thermally and electrically connected between the first and second means and disposed to receive the electrical signal on the inner conductor within said body, at least one other bolometer element electrically insulated from the electrical energy on the inner conductor within said body, means thermally connecting the terminals of said other bolometer element to the second means, and means providing electrical connections to said bolometer elements, whereby a power measuring instrument is connectable to said bolometer elements for providing an indication of the power of signal on said transmission line.

10. Power detector apparatus comprising a section of conductor of a wave transmission line which conducts a signal therein, a first bolometer element having a first terminal electrically insulated from said section of conductor and a second terminal and being disposed within said section of conductor to receive applied signal, a second bolometer element having a first terminal electrically insulated from said section of conductor and a second terminal and being positioned outside said section of conductor, means forming a first path of high thermal conductivity and low electrical conductivity between said first terminals of the first and second bolometer elements, said means forming the first path being thermally insulated from said section of conductor, means forming a second path of high thermal and electrical conductivity between said second terminals of the first and second bolometer elements, said means forming the second path being thermally insulated from and electrically connected to said section of conductor, and means providing electrical connections to said bolometer elements, whereby a power measuring instrument is connectable to said bolometer elements for providing an indication of the power of signal on said transmission line.

References Cited by the Examiner
UNITED STATES PATENTS 2,799,826  7/1957  Eberle _____ 324—95

WALTER L. CARLSON, *Primary Examiner.*

R. V. ROLINEC, *Assistant Examiner.*